United States Patent [19]

Pellenbarg et al.

[11] Patent Number: 4,902,441

[45] Date of Patent: Feb. 20, 1990

[54] SELF MOISTENING COMPOSITION FOR DEACTIVATING TOXIC SUBSTANCES AND METHOD OF USE

[75] Inventors: Robert E. Pellenbarg, Silver Spring, Md.; Homer W. Carhart, Annadale, Va.

[73] Assignee: The United States of America as represented by the Secretary of the Navy, Washington, D.C.

[21] Appl. No.: 176,057

[22] Filed: Mar. 31, 1988

[51] Int. Cl.[4] .......................... D06L 3/02; D06L 3/06; C01B 11/06

[52] U.S. Cl. .................................. 252/187.26; 252/99; 252/187.25; 252/186.43; 252/186.1

[58] Field of Search ...................... 252/187.25, 187.26, 252/186.24, 186.1, 186.43, 194, 363.5; 424/10, 164, 130, 661, 665; 422/28, 37

[56] References Cited

U.S. PATENT DOCUMENTS

| | | | |
|---|---|---|---|
| H336 | 10/1987 | Seiders | 252/312 |
| 2,432,114 | 12/1947 | Marquand et al. | 424/130 |
| 3,714,349 | 1/1973 | Wolverton | 424/665 |
| 3,892,905 | 7/1975 | Albert | 524/233 |
| 4,231,890 | 11/1980 | Yagi et al. | 252/186.29 |
| 4,381,247 | 4/1983 | Nakagawa et al. | 252/186.43 X |
| 4,578,119 | 3/1986 | Marcus et al. | 252/194 X |
| 4,594,239 | 6/1986 | Pluim, Jr. | 252/187.26 X |
| 4,725,378 | 2/1988 | Krawczak | 252/187.25 X |
| 4,803,047 | 2/1989 | Pluim, Jr. | 424/10 X |
| 4,850,729 | 7/1989 | Kramer et al. | 252/186.29 X |

*Primary Examiner*—John F. Terapane
*Assistant Examiner*—Daniel S. Metzmaier
*Attorney, Agent, or Firm*—Thomas E. McDonnell; A. David Spevack

[57] ABSTRACT

An self-moistening inactivating agent for toxic substances provided in a water-vapor-impervious container. The agent comprises an intimate admixture of at least one hygroscopic material and at least one oxidizing agent. The agent can also contain chelating materials and electrostatic materials. The agent is used to inactivate toxic substances on the ground or on contaminated surfaces. Particularly, the agent inactivates organo phosphorous toxic agents.

20 Claims, No Drawings

SELF MOISTENING COMPOSITION FOR DEACTIVATING TOXIC SUBSTANCES AND METHOD OF USE

BACKGROUND OF THE INVENTION

1. Field of the Invention

This invention relates to a self moistening composition for inactivating toxic substances and to its method of application. Specifically, this invention pertains to a finely powdered composition containing a mixture of a hygroscopic compound capable of absorbing sufficient water from the atmosphere to self-dissolve and a compound capable of interacting and deactivating toxic substances such as herbicides, insecticides, and CBW agents.

2. Description of the Prior Art

Modern society generates many toxic substances such as insecticides, bacterial metabolites, dioxins, PCBs and the like. Although low levels of these toxic substances can be disposed of by natural processes, excess concentrations of these substances cause severe hazards to both animal and plant life. Included in these toxic substances are chemical and biological warfare agents (CBW) which could be used purposely to harm and destroy both animal and plant life. To protect life, it is necessary to deactivate these toxic substances.

The detoxification processes now in use have included diluting the toxic substance, removing the toxic substance, and chemically altering the toxic substance, so that it is innocuous to biological systems. The first two approaches do not eliminate the toxic threat, but merely lessen its threat or move the potential impact of the toxin to another location. The third approach, inactivating the toxic substance, is an ultimate solution.

From ancient to modern times, toxic wastes and substances were disposed of by scattering the substances into the environment such as by dumping the material onto ground dumps, into sanitary land fills, or into rivers which ultimately carried the toxic substances to the ocean. It was hoped that time and natural processes would degrade or deactivate the toxic material. In modern times, particularly through an accident or hostile event, the volume of toxic substances often far exceeds the capability of the natural environmental processes to break down the toxic substances. In addition, toxic materials, such as dioxins and PCBs are, to a great extent, unreactive and cannot be broken down efficiently by natural processes. It is necessary to have other means to deactivate such resistant toxic material.

Waste treatment processes are designed to chemically alter the molecular structures of toxic substances, rendering the toxic substances, and whatever substrate it is on, less harmful prior to further processing and ultimate disposal. If the toxic substance is in a readily handled form, such as a bulk halogenated hydrocarbon solvent, the toxic waste could be incinerated.

However, there are many situations which do not lend themselves to a deactivation of the toxic substance by incineration. These situations include instances, such as chemical spills resulting from the use of herbicides, insecticides, and other biocides, railroad accidents, or electrical transformer accidents which can release large quantities of toxins into the soil. Other situations can cause contamination of valuable buildings or equipment which do not lend themselves to cleansing by incineration. In such situations, inactivation of the toxic substance could benefit from a reaction which would utilize a strong oxidizing reagent, such hydrogen peroxide, ozone or hypochlorite ion to alter the chemical structure of the toxic substance on a valuable surface. However, such treatments often require large quantities of water to assist in the inactivation reaction and to flush away the reaction products.

In U.S. Statutory Invention Registration No. H366, Seiders describes the use of microemulsions containing sulfolanes to inactivate organophosphorus substances. Seiders requires a relatively large amount of either sea water, brackish water, or sweet water to assist the reaction. However, water is not always readily available in the large quantities necessary for these type of inactivation reactions.

SUMMARY OF THE INVENTION

Therefore it is an object of this invention to provide a composition and method of use which will inactivate toxic substances without the need for providing large quantities of water.

It is also an object of this invention to provide a composition and method of inactivating toxic substances by utilizing ambient atmospheric moisture.

Further, it is an object of this invention to provide a composition for the deactivation of toxic substances which can be easily stored and transported.

In addition, it is an object of this invention to provide a composition for the deactivation of toxic substances which can be easily spread over large ground areas or immobile objects to deactivate toxic substances spread on these surfaces or immovable objects.

It is also an object of this invention to provide a water vapor impervious distribution unit for the composition of this invention.

These and other objects of this invention can be achieved by a self moistening composition comprising an admixture of a hygroscopic material and a deactivation agent of the type capable of releasing strong oxidizing agents such as hypohalite ion or, a peroxide ion. This finely powdered dry mixture can be easily stored or transported and can be rapidly spread by any of the known means for spraying or dispersing powders over a wide area. In use, the material is distributed in sufficient concentration so that the hygroscopic material can absorb water from the atmosphere to give a self dissolving decomposition solution for the target toxic substance and the incorporated oxidizing agent oxidizes the toxic substance.

PREFERRED EMBODIMENTS

In many compositions which require water as a dispersant or the medium for chemical reaction, the water constitutes the heaviest and bulkiest of the constitutents to be transported. In addition, the storage of aqeuous solutions, particularly aqueous solutions containing strongly basic or acidic reagents, can cause long term storage problems such as the corrosion of containers. It is most convenient to store reactive agents in the form of dry powders. However, supplying water to activate these dry compositions under field conditions, or when needed on a rapid basis, often can be a problem.

The earth's atmosphere contains water vapor which can be utilized to provide the aqueous medium necessary for many inactivation reactions for toxic substances. Atmospheric water vapor can be utilized by the use of many compounds which are extremely hygroscopic in nature and can absorb water out of the atmosphere causing the compound and any mixture in which it is a part to become deliquescent. Indeed, there are some solid compounds which are so hygroscopic that they will literally create their own self solutions, and continue to dilute themselves even when a solution is formed because the solutions of these compounds are in turn hygroscopic.

The compositions of this invention comprises a combination of a strongly hydroscopic agent, and a toxin deactivation agent. The hygroscopic agent are preferably those which will form a pasty mix with sufficient liquid phase present to allow water based reactions to occur by sorbing atmospheric water vapor. A variety of metal halides such as aluminum chloride, magnesium chloride, calcium chloride, zinc chloride, or iron chloride are very useful as the hygroscopic material. In addition, metal nitrates, such as zinc nitrate, magnesium nitrate, and iron nitrate, can also be used as the hygroscopic agent.

There are several organic ions which form deliquescent salts which are also sufficiently hygroscopic to serve in this invention. These include sodium formate, sodium ethyl sulfate and magnesium acetate. In addition, purely organic materials, such as polyethylene glycol or polyvinyl pyrrollidone are potentially useful in absorbing water from the atmosphere.

Inorganic salts will form ionic solutions which can be potentially corrosive to metals. The aforementioned organic absorbents provide a non-ionic system which is more of a buffer and less corrosive to the metal systems. Of course, it is well within the skill in the art to combine two or more hydroscopic materials, such as an inorganic salt and an organic material, to provide the best balance of absorbing hydroscopic mixture and hygroscopic buffer material. Alternately, it is possible to synthesize organic polymers which contain hygroscopic/deliquescent sites giving a very strong water vapor absorbing substance which will release few ions when saturated. An example is a copolymer of ethylene sulfate and ethylene.

The active agent of these detoxifiers can provide a strong oxidizing agent such as a peroxide molecule or hypohalite molecule to interact with the toxic substance and decompose the toxic substance to more benign materials. These active oxidizing agents include sodium perchlorate, and sodium hypochlorite, sodium hypobromite, hydrogen peroxide, magnesium perchlorate, sodium perborate, sodium percarbonate, or such oxidizers as are well known in the laundering industry, and are frequently employed as bleaches.

In addition, various well known chelating agents can be included with as the detoxification agent. These chelating agents can interact with the organic or inorganic toxic substances, or the oxidized byproducts, removing their capability of interacting with the environment. Examples of such agents are ethylene diamine tetracetic acid, nitrilo-triacetic acid, or oxalate salts. Also, it is preferred that at least one or more of the compounds in the composition should be relatively electrostatic so that when the materials are spread over the target site, the powder will adhere to the surface and therefore relatively uniformly coat the contaminated surface and speed the treatment. This electrostatic material can also be an additional component of the self-moistening composition.

The dry powder materials described in this invention are easily spread by any of the well known dusting apparatus or machines. Obviously, it is important that the composition be kept free of moisture. The composition can be transported to the contamination site in airtight, water-vapor-impervious containers, such as water impermeable plastic bags, hermatically sealed, plastic coated cans, or the like. When needed, the container is opened and the material placed in dust spreading devices, and spread over the contaminated area. Alternatively, as needed, the material can be shaken or spread directly from the container.

The exact proportions of the materials are well within the skill of the element when the target toxic substance is known. For general applications it is preferred to store the agent, in equal molar amounts of hygroscopic material or oxidizing material. Each container of agent should contain sufficient material to inactivate about 3 or 4 moles of toxic substance. Preferably each container should have at least 2 pounds (~1 kilos) of the composition.

Now having generally described the invention, the following examples are provided to show specific applications of the invention.

EXAMPLE I

One mole of magnesium chloride ($MgCl_2 \cdot 6H_2O$, 203 g) is mixed with one mole of sodium perborate ($NaBO_3 \cdot H_2O$, 100 g). The sodium perborate will act as the oxidizer and the magnesium chloride will act as the water absorbent material. The amount of magnesium chloride can be increased for use in drier atmospheres.

EXAMPLE II

One mole of sodium ethylsulfate ($NaC_2H_5SO_4 \cdot H_2O$, 166 g) is mixed with one mole of sodium per sulfate ($Na_2S_2O_8$, 38 g). The proportion of ethyl sulfate may be increased for drier atmospheric conditions. The sodium ethyl sulfate also provides a mild detergent action to the resulting wet mix, and thus aids in the physical removal of the toxic substances from the contaminated surfaces.

EXAMPLE III 100 g of polyethylene glycol (0.1 mole of 1,000 MW) are mixed with one mole of lithium hypochlorite (LiOCl, 58 g).

Each of the foregoing formulations in Examples I-III are thoroughly mixed and packaged in hermatically sealed water-impervious containers. The containers should be of a plastic such as Mylar® a polyethylene terephthalate film, or other material which will not interact with the composition of the formulation and is not permeable to water vapor or other materials which can interact with the formulation. It is preferred that filled packages be stored under dry conditions between 40°-90° F. to preserve the oxidizer in the mix.

The material can be dispersed and broadcast over a contaminated substrate in any one of several ways. A military unit could carry quantities of the suggested formulations in sealed, one pound shaker type containers. Prior to or subsequent to a chemical warfare attack, personnel could sprinkle the dry powdered decontaminant agent on valuable surfaces. The powder would adhere to the surface or absorb droplets of chemical agent, moisten and swell. As the powder absorbed additional water vapor from both the surrounding atmosphere and any existing moisture on the surfaces, the composition would begin to self dissolve, the oxidizer would then react with the chemical agent, deactivating it. More powder could be sprinkled onto the now moist portions of the contaminated surfaces as needed. The

BEST AVAILABLE COPY surface could be wiped clean with a handful of uncontaminated soil, collected on uncontaminated vegetation, or, alternatively, the moistened powder could be left to fall of its own accord.

In other situations, the powder can be distributed by a handpowered blower device such as used to dispense biocidal dust in an agricultural operation. Any other dusting equipment, including airborne dusting equipment could also be used to distribute the powder over a contaminated area. Of course, the formulations can be combined with a sorbant material, such as vermiculate or the like, which has been treated with biocidal agents for use in combating a combination of biological and chemical toxins.

There are numerous civilian applications for the formulations of the invention. It is not uncommon for accidental spills of toxins to occur in farming. Very often these accidental spills occur on the open ground where severe environmental damage can be caused by rain run off to the water system. A farmer can have shaker cans or packages of this detoxification material available on his tractor or with his spraying equipment. When an accidental spill occurs, the emergency can or pouch can be broken open and the powdered material spread over the spill area. In those situations where the spill occurs directly onto the ground, the material can be tilled into the soil along with the contaminant thereby inactivating the toxic material, as the treatment formulation sorbs water from the surrounding air and ground environment. The spilled material would then be detoxified or inactivated before it has a chance to enter the water system or overdose plants in the area.

Obviously many modifications and variations of the present invention are possible in light of the above teachings. It is therefore to be understood that within the scope of the appended claims, the invention may be practiced otherwise than as specifically described.

What we claim is:

1. A self moistening, powdered, toxic-substance inactivating agent comprising an intimate admixture of a sufficient amount of at least one hygroscopic material to cause said agent to moisten and self dissolve and at least one oxidizing material.

2. An agent according to claim 1 wherein the hygroscopic material is a metal halide.

3. An agent according to claim 1 wherein the hygroscopic material is a metal nitrate salt.

4. An agent according to claim 1 wherein the hygroscopic material is a deliquescent organic salt.

5. An agent according to claim 1 wherein the hygroscopic material is a water-absorbing organic material.

6. An agent according to claim 1 wherein the hygroscopic material comprises a water absorbing organic material and a deliquescent salt.

7. An agent according to claim 2 wherein the metal halide is magnesium chloride.

8. An agent according to claim 4 wherein the deliquescent organic salt is sodium ethylsulfate.

9. An agent according to claim 5 wherein the water absorbing organic material is polyethylene glycol.

10. An agent according to claim 1 wherein the oxidizing material provides a peroxide ion.

11. An agent according to claim 1 wherein the oxidizing material provides a hypohalite ion in aqueous solution.

12. An agent according to claim 11 wherein the oxidizing material is sodium hypochlorite.

13. An agent according to claim 1 which contains a chelating material.

14. An agent according to claim 13 in which at least one of the hygroscopic material, oxidizing material and chelating material are electrostatic.

15. An agent according to claim 7 wherein the oxidizing material is sodium perborate.

16. An agent according to claim 8 wherein the oxidizing agent is sodium peroxosulfate.

17. An agent according to claim 9 wherein the oxidizing agent is lithium hypochlorite.

18. A sealed water-vapor-impervious container enclosing an effective amount of a powdered toxic-substance inactivating agent comprising an intimate admixture of a sufficient amount of at least one hygroscopic material to cause said agent to moisten and self dissolve and at least one oxidizing material.

19. A container according to claim 18 having a inactivating agent distribution means integral with said container.

20. A container according to claim 18 having a film of a polyethylene terephthalate film to make said container water-vapor impervious.

* * * * *